March 22, 1927.
W. G. STRUTHERS
1,621,691
CLAMP
Filed June 21, 1926
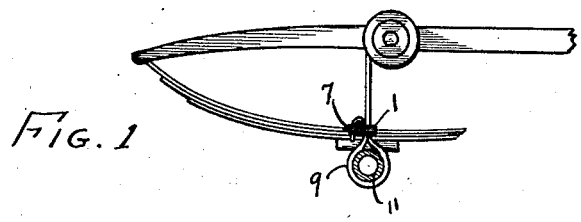
Fig. 1
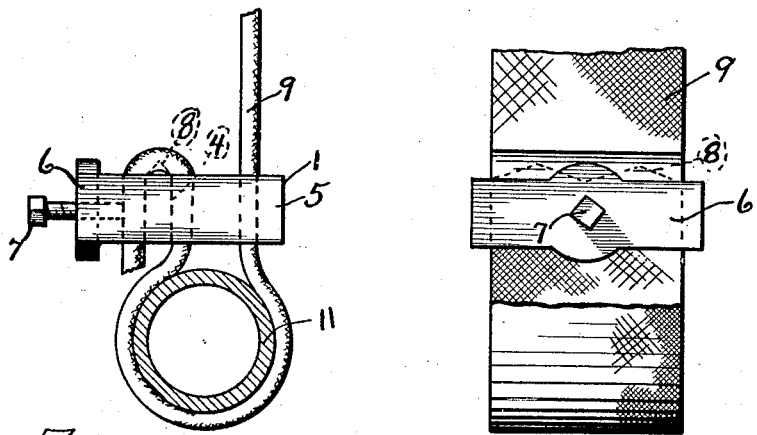
Fig. 2
Fig. 3
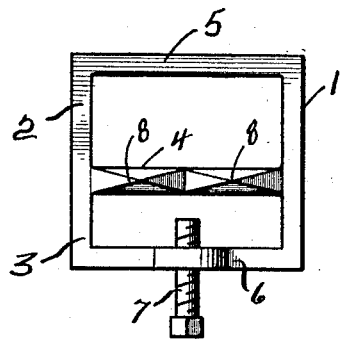
Fig. 4
INVENTOR.
WILLIAM G. STRUTHERS
BY
Harry C. Schroeder
ATTORNEYS.

Patented Mar. 22, 1927.

1,621,691

UNITED STATES PATENT OFFICE.

WILLIAM G. STRUTHERS, OF OAKLAND, CALIFORNIA, ASSIGNOR TO STRUTHERS MANUFACTURING CO., OF OAKLAND, CALIFORNIA, A CORPORATION OF CALIFORNIA.

CLAMP.

Application filed June 21, 1926. Serial No. 117,581.

The present invention relates to improvements in clamps and has particular reference to a clamp adapted to be used for fastening a flexible element to a rigid rod, shaft or the like. My clamp is particularly designed for use in connection with a shock absorber such as described by me in a number of copending applications, as for instance, in Serial Number 657,015, #729,941 and others. In these shock absorbers a wide band is used as a connecting element between a part of the axle or axle housing and the rebound mechanism secured to the spring or the frame resting thereon.

It is particularly contemplated in the present invention to provide a very simple clamping means for securing the flexible band to the axle housing, the means answering two purposes, namely, that of absolutely preventing any slipping and that of affording an easy means for adjusting the length of the used portion of the band.

The preferred form of my clamp is illustrated in the accompanying drawing in which:

Figure 1 shows an assembly view of my shock absorber with my clamp for securing the band of the absorber to the axle of a motor vehicle.

Figure 2 is an enlarged detail view of my clamp in side elevation, with the band in place.

Figure 3 is a front view of the same device.

Figure 4 is a top plan view of my clamp.

While I have shown only the preferred form of my invention, it should be understood that various changes or modifications may be made within the scope of the claims hereto attached without departing from the spirit of the invention.

The particular form of my clamp appears best from Figure 4 from which it is seen that a ring shaped element 1 of rectangular form is divided into two rings 2 and 3 by a dividing wall 4 running parallel to two sides 5 and 6 of the ring and being somewhat closer to the latter than to the former. The ring wall itself is also preferably rectangular in form as appears from a comparison of Figures 2 and 4. The wall 6 has a set screw 7 threaded thereinto which points toward the dividing wall 4. The latter has points or teeth 8 projecting upwardly therefrom for engagement with the band guided over the said wall.

The use of my device will be readily understood by referring to Figure 2. The band 9 is guided through the larger opening or ring adjacent the wall 5, passed around the axle housing 11 and back through the larger ring of the clamp adjacent the wall 8 whereupon the free end is turned over the top of the said dividing wall 8 and introduced into the second ring to be securely held therein by tightening the set screw 7 upon the same. The set screw and the teeth 8 on top of the dividing wall co-operate in firmly securing the end of the band while at the same time the length of the band may be readily adjusted after unloosening the set screw.

Having described my invention, I claim:—

1. A clamp for fastening a flexible element upon an object comprising two adjacent rings having a common wall, the first ring allowing the flexible element to be doubled therethrough so as to form a loop on one side thereof and the second ring allowing the free end of the flexible element to be guided thereinto and having means associated therewith for holding the sand end against slipping, the common wall of the two rings having teeth extending from the face on which the flexible element turns to aid in preventing slipping.

2. A clamp for fastening a flexible element upon an object comprising two adjacent rings having a common wall, the first ring allowing the flexible element to be doubled therethrough so as to form a loop on one side thereof and the second ring allowing the free end of the flexible element to be guided thereinto and having means associated therewith for holding the said end against slipping, the common wall having means thereon engaging the flexible element to aid in preventing slipping.

3. A clamp for fastening a flexible element upon an object comprising a ring allowing the element to be doubled therethrough so as to form a loop on one side thereof, teeth projecting from one face of the ring penetrating into the flexible element when the free end of the same is turned over the said face and means for fastening the free end to the outside of the ring.

4. A clamp as defined in claim 3 in which the latter means comprises a yoke extending from the outside of the ring and in the plane thereof and a set screw threaded through the yoke into the flexible element.

In testimony whereof I affix my signature.

WILLIAM G. STRUTHERS.